(12) United States Patent
Taniguchi et al.

(10) Patent No.: US 6,699,584 B2
(45) Date of Patent: Mar. 2, 2004

(54) NITRIC ACID-BASED SALT GRANULE AND AGGREGATE THEREOF

(75) Inventors: Masatoshi Taniguchi, Osaka (JP); Hideo Amo, Tokushima (JP); Motoaki Murakami, Tokushima (JP)

(73) Assignee: Otsuka Chemical Co., Ltd., Osaka (JP)

( * ) Notice: Subject to any disclaimer, the term of this patent is extended or adjusted under 35 U.S.C. 154(b) by 0 days.

(21) Appl. No.: 10/014,473

(22) Filed: Dec. 14, 2001

(65) Prior Publication Data

US 2003/0113537 A1 Jun. 19, 2003

(30) Foreign Application Priority Data

Dec. 14, 2000 (JP) ........................................ 2000-380285

(51) Int. Cl.[7] ............................................... B32B 33/00
(52) U.S. Cl. ........................................ 428/402; 428/403
(58) Field of Search ................................ 428/402, 403, 428/323, 332

(56) References Cited

U.S. PATENT DOCUMENTS 5,858,532 A * 1/1999 Kozawa et al. .............. 428/402
5,938,813 A * 8/1999 Araya et al. .................... 71/30

FOREIGN PATENT DOCUMENTS

JP 2001-151671 * 6/2001

* cited by examiner

Primary Examiner—Ramsey Zacharia
(74) Attorney, Agent, or Firm—Whitham, Curtis & Christofferson, P.C.

(57) ABSTRACT

A granule of a compound comprising a nitrate or nitrite, wherein a part of the body of the granule has a protrusion, and an aggregate of the granules.

14 Claims, 6 Drawing Sheets

NITRIC ACID-BASED SALT GRANULE AND AGGREGATE THEREOF

BACKGROUND OF THE INVENTION

1. Field of the Invention

The present invention relates to a nitric acid-based salt granule comprising a nitrate or nitrite, and an aggregate thereof.

2. Background Art Relating to the Invention

Nitric acid-based salts, such as nitrates (e.g., potassium nitrate, sodium nitrate, ammonium nitrate, calcium nitrate, etc.), nitrites (e.g., potassium nitrite, sodium nitrite, ammonium nitrite, calcium nitrite, etc.) and hydrates thereof are important as nitrogenous fertilizers. In addition, they are widely used as salt bath materials, gunpowder materials, fireworks materials, dye materials, chemical material, and the like.

Recently, fused potassium nitrate has been used as an ion exchanger for chemical reinforcement of glass. In particular, this kind of a nitric acid-based salt has been used in the art of optical fiber.

The nitric acid-based salts are designated as dangerous substances. Thus, serious attention should be paid to handling of the nitric acid-based salts during production, transportation and storage.

Accordingly, it has been known that nitric acid-based salts are stored in the shape of a granule rather than in the shape of a powder. For example, JP-A-7-109112 discloses the formation of a nitric acid mixture in a disk-shape tablet, a semicylindrical granule or a cylindrical granule.

However, a nitric acid-based salt granule having such a shape has the following disadvantages during transportation and the like.

In other words, in order to use nitric acid-based salt granules, the granules are not took out one by one for transportation. Instead, some amount (large number) of the granules are aggregated for handling. Industrially, the aggregates from the storage warehouse are piled up on a belt conveyor, and then conveyed to various facilities.

However, since the transportation on a conveyor or the like is vibrated, the aggregates of granules molded in the conventional shape such as a disk-shape tablet are easy to get out of the shape piled up on the conveyor belt (easily break into constituent granules) and fall from the conveyor belt. In particular, the aggregates of granules in the shape of a disk-shape tablet or a cylinder granule are easy to break into constituent granules and fall from the belt, which markedly causes the above problem.

Furthermore, while the aggregates are stored, the lower part of the aggregates is subject to a load of the own weight of the aggregates accumulated thereon and thus is easy to crush. When the granules thus break, the positive efforts of molding the nitric acid-based salt compound into a granule become meaningless. It has thus been desired to provide a nitric acid-based salt granule which is hard to break.

SUMMARY OF THE INVENTION

Therefore, an object of the present invention to provide a nitric acid-based salt granule which is hard to roll over when it is used alone, and which is hard to landslide when it is used as an aggregate.

Another object of the present invention is to provide a nitric acid-based salt granule having a shape which is hard to break.

These and other objects of the present invention have been accomplished by a granule of a compound comprising a nitrate or nitrite, wherein a part of the body of the granule has a protrusion.

Furthermore, these and other objects of the present invention have been accomplished by a granule of a compound comprising a nitrate or nitrite, wherein the compound is compressed so that:

the body of the granule is substantially hemispherical or substantially spherical;

the body of the granule is rimmed with a protrusion toward the diameter direction on the periphery of the body of the granule; and the body and the protrusion are integrally molded.

Moreover, these and other objects of the present invention have been accomplished by an aggregate of the above granules.

DETAILED DESCRIPTION OF THE INVENTION

Figure 1A:
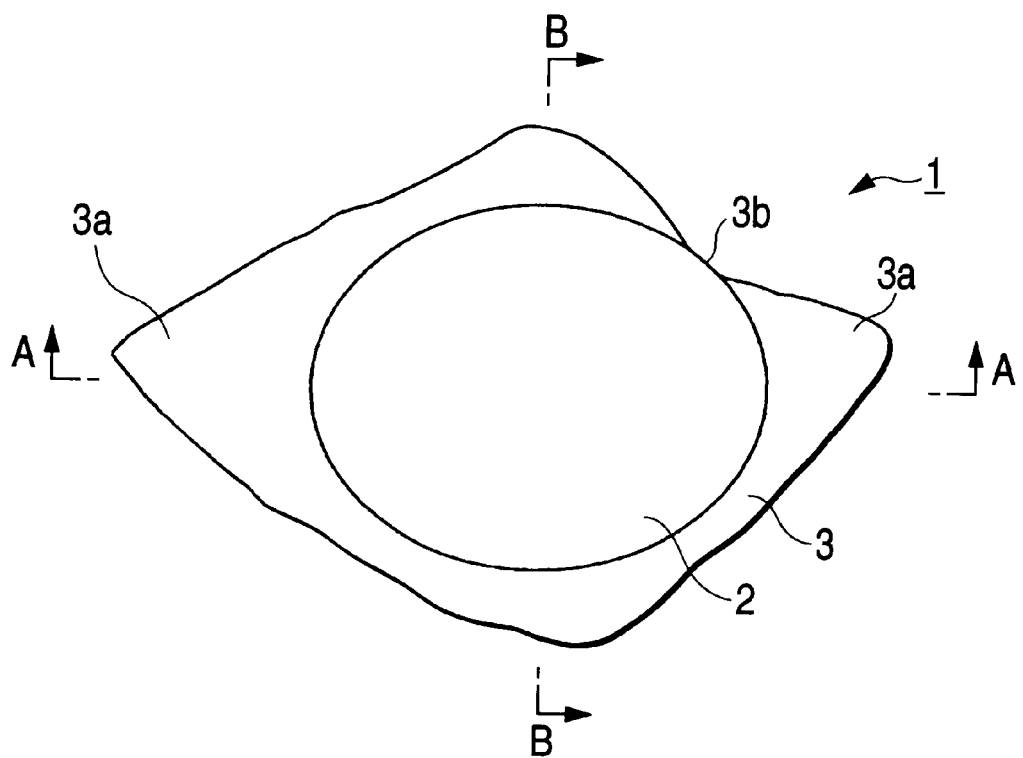
FIG. 1A shows a plane view illustrating an embodiment of a nitric acid-based salt granule of the present invention.

The present invention provides a granule which is obtained by molding a compound comprising a nitrate or nitrite, wherein a part of the body 2 of the granule has a protrusion 3.

In the nitric acid-based salt granule of the present invention comprising the protrusion 3 formed on the body 2 of the granule, the protrusion 3 gives a rolling resistance to the body 2 of the granule. In an aggregate of the nitric acid-based salt granules, the various protrusions 3 interfere with each other so that the aggregate is difficult to landslide when piled up as compared with granules having the conventional shape.

In particular, in an aggregate of nitric acid-based salt granules having an amorphous protrusion, the protrusions on the granules interfere with each other at random. Thus, since the aggregate is hard to landslide when piled up, the amorphous protrusion is preferable.

The protrusion on the granule may be provided on a part of the body of the granule. In order to give the protrusion a rolling resistance in all directions along the surface of granules, preferably, the protrusion is provided toward the diameter direction on the periphery of the body of the granule, and more preferably, the body of the granule is rimmed with the protrusion like a sword guard shape or a brim shape toward the diameter direction on the periphery of the body of the granule.

Also, the body of the granule in the present invention is preferably substantially hemispherical or substantially spherical. A compound comprising a nitrate or nitrite is compressed so that the nitric acid-based salt granule wherein the body of the granule is substantially hemispherical or substantially spherical; the body of the granule is rimmed with a protrusion, like a sword guard shape or a brim shape, toward the diameter direction on the periphery of the body of the granule; and the body and the protrusion are integrally molded is provided.

The term "substantially spherical" includes a true sphere, a flat sphere (e.g., shape as that of "Asadaame"® (produced by Asadaame Co., Ltd.), "M&M's"® Chocolate Candy (produced by Mars, Incorporated)), an ellipsoid (e.g., shape as that of a Rugby ball), a shape obtained by connecting two hemispheres with a cylinder having the same diameter as that of the hemispheres (e.g., shape as that of a medicine capsule) and the like. The term "substantially hemispherical" includes a semi-flat sphere, a semi-ellipsoid and the like in the same manner as the term "substantially hemispherical".

Such a nitric acid-based salt granule is hard to roll over. When it is in the shape of an aggregate, it is hard to landslide when piled up. A nitric acid-based salt granule having a protrusion formed on the body such that the thickness of the protrusion is from 0.3 to 0.5 times the diameter of the body of the granule is preferred because it exhibits a high load resistance and thus is hard to break during storage, transportation and the like.

The granular material of the present invention can be produced by a method which comprises pelletizing the material using a pelletizer having a mold of the shape corresponding to that of the granule of the present invention, or a method which comprises compression-molding and extruding a compound powder containing a nitric acid-based salt over a pair of rolls having many depressions formed thereon in a briquetting machine with the gap between the rollers being predetermined to 1.5 mm or larger, preferably from 1.5 mm to 2.0 mm, and then cutting the tabular blocks thus extruded at portions other than the extruded portions corresponding to the depressions.

The present invention will be explained in more details based on the drawings.

Figure 1B:
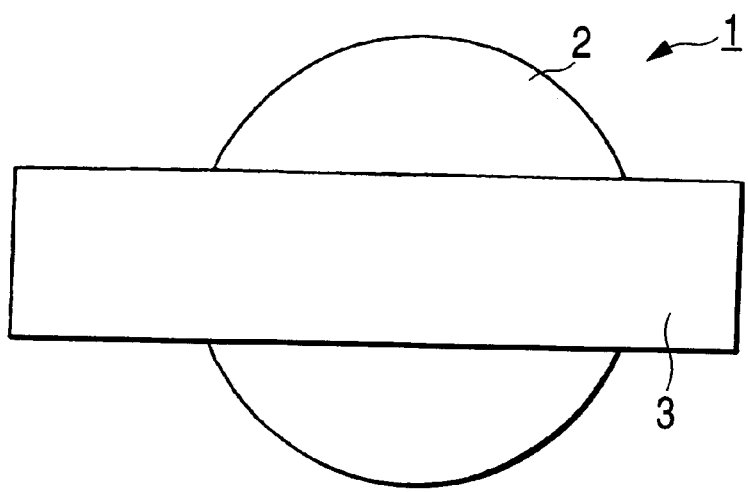
FIG. 1B shows a side view illustrating an embodiment of a nitric acid-based salt granule of the present invention.
Figure 2A:
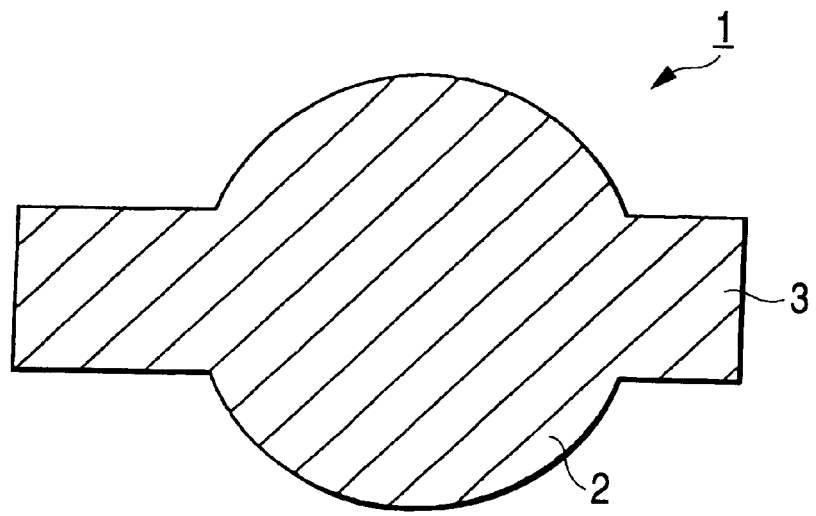
FIG. 2A shows a sectional view taken on line A—A of FIG. 1A.
Figure 2B:
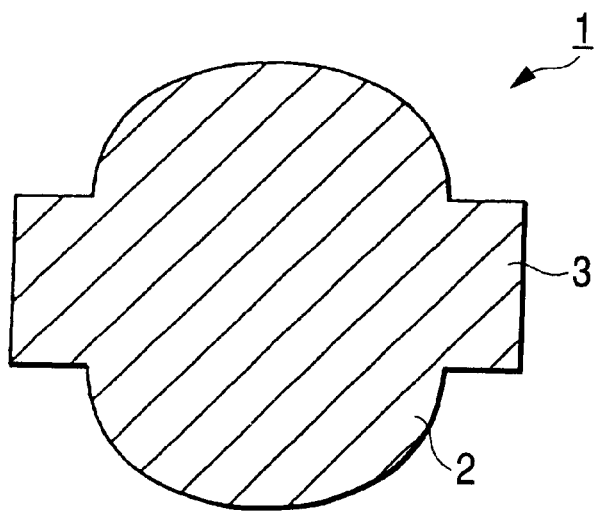
FIG. 2B shows a sectional view taken on line B—B of FIG. 1A.

In FIGS. 1 and 2, a nitric acid-based salt granule 1 is obtained by molding a nitric acid-based salt compound such that the body 2 of the granule and a protrusion 3 provided on the body 2 are integrally molded.

Figure 3A:
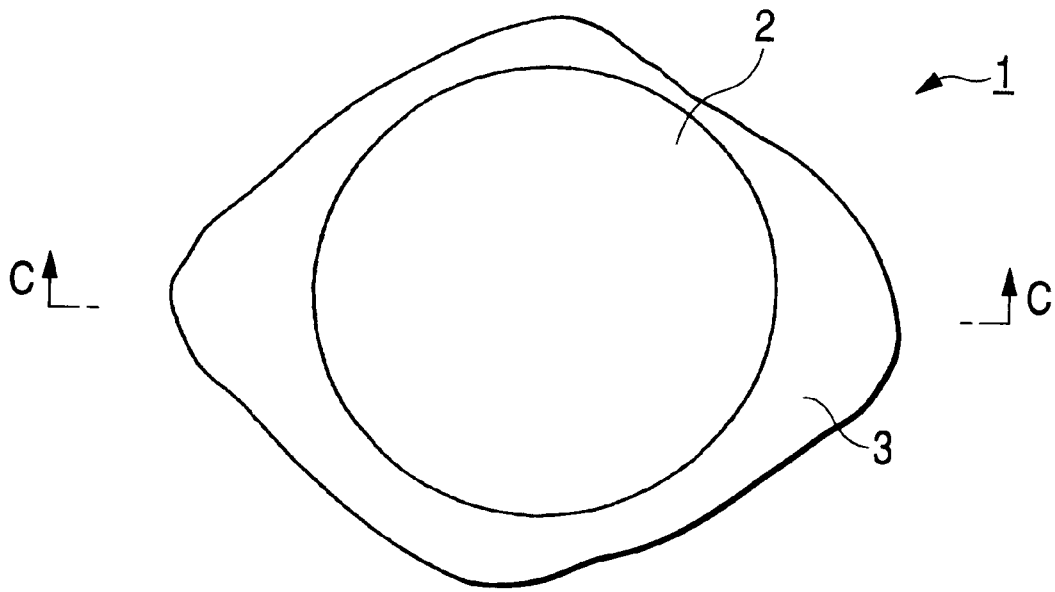
FIG. 3A shows a plane view illustrating another embodiment of a nitric acid-based salt granule of the present invention.
Figure 3B:
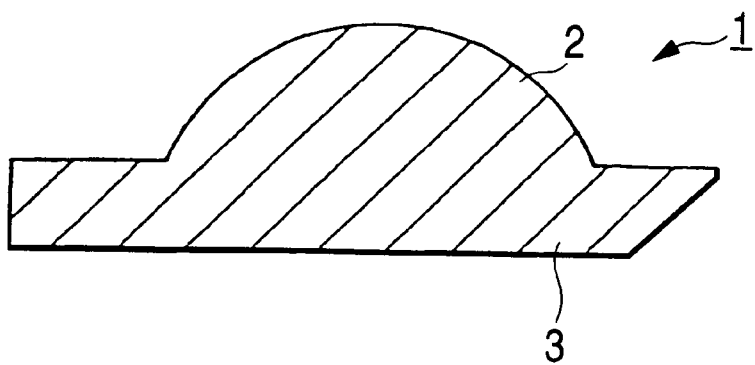
FIG. 3B shows a sectional view taken on line C—C of FIG. 3A.

Examples of the shape of the body 2 constituting the granule 1 include a substantial sphere (e.g., a substantial ellipsoid (as shown in FIGS. 1 and 2), a true sphere, etc.), a substantial hemisphere (e.g., a semi-ellipsoid, a hemisphere (as shown in FIG. 3), etc.), a substantial cube (e.g., a rectangular parallelepiped, etc.), a substantial column (e.g., a circular cylinder, a prism, etc.), a substantial cone (e.g., a triangular pyramid, a cone, etc.), and the like.

Among these shapes, a substantial sphere and a substantial hemisphere are preferable because the compound powder can be almost uniformly compressed during molding to thereby produce a granule which is hard to break. Particularly, a substantially sphere is preferable.

The protrusion 3 provided on the body 2 of the granule may be any shape. Examples include a flat non-circular protrusion (e.g., a sword guard shape, a brim shape, etc.) rimming the body 2 toward the diameter direction on the periphery of the body 2 of the granule (the periphery of the body 2 of the granule along the horizontal plane crossing the center of the gravity of the granule 2), a raised protrusion on a part of the periphery of the body 2 of the granule, and the like.

Among these, particularly, the protrusion 3 rimming the body 2 is preferred because the resulting granule is hard to roll over in all directions. Furthermore, the protrusion 3 having a spire 3a as shown is preferable because when the granules 2 are aggregated, they interfere with each other and are hard to landslide.

Figure 4A:
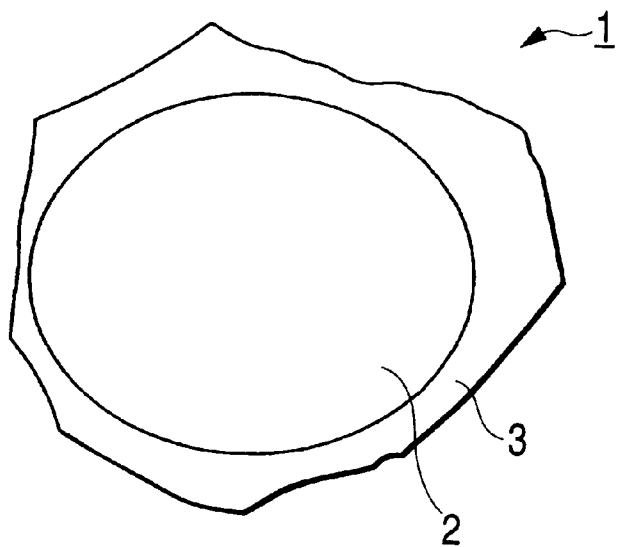
FIGS. 4A and 4B each shows a plane view illustrating a further embodiment of a nitric acid-based salt granule of the present invention.
Figure 4B:
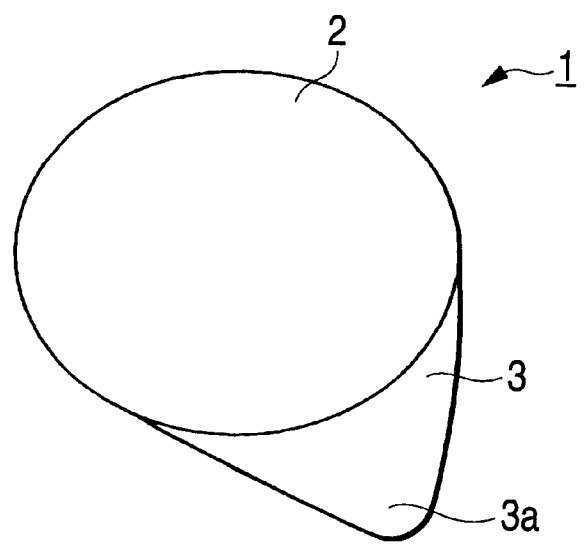

All the protrusions 3 on the granule 1 may have the same shape. However, the granule 1 preferably have protrusions 3 having any different (amorphous or irregular) shapes as shown in FIGS. 1 and 4.

Figure 5A:
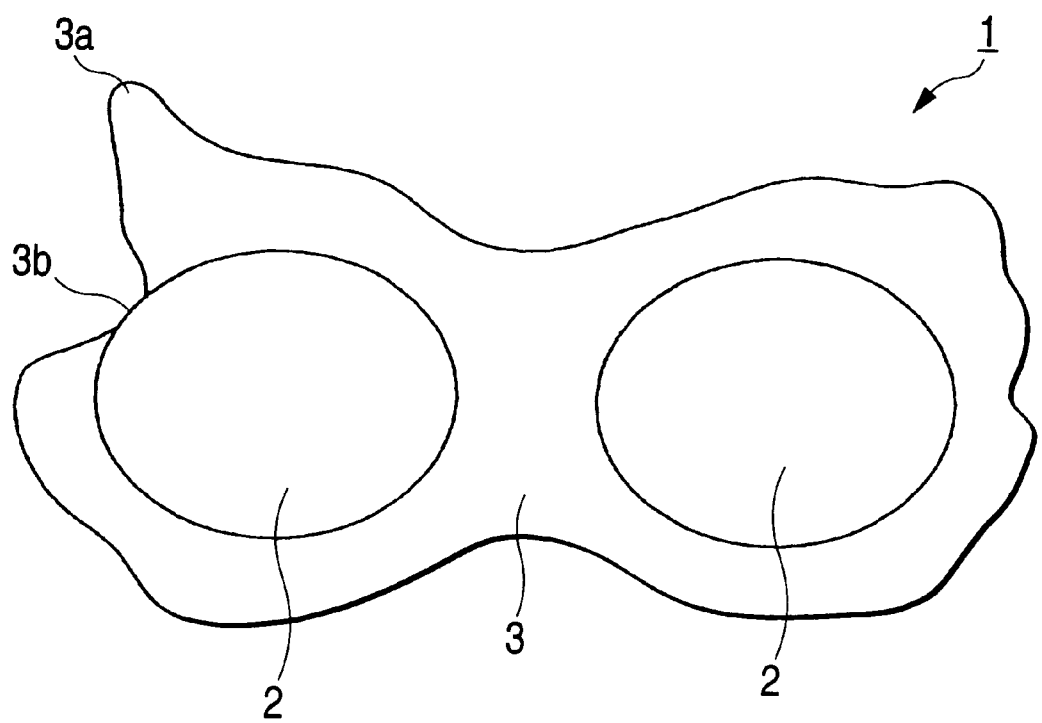
FIG. 5A is a plane view illustrating a still further embodiment of a nitric acid-based salt granule of the present invention.
Figure 5B:
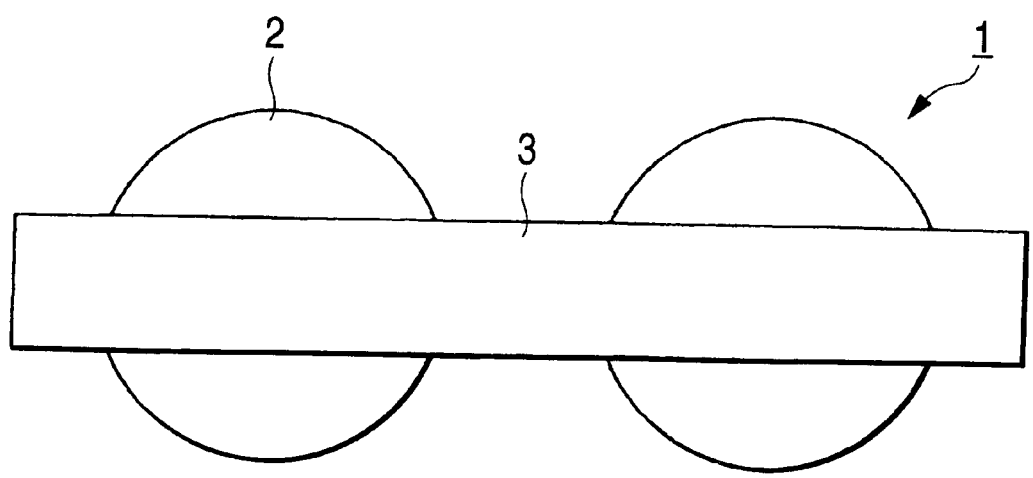
FIG. 5B is a side view illustrating a still further embodiment of a nitric acid-based salt granule of the present invention.

Furthermore, the granule 1 may have two or more (plural) bodies 2 of the granule, and the bodies 2 may be connected to each other via a protrusion 3 as shown in FIG. 5.

The protrusion 3 rimming the body 2 is not limited to one provided protrusively on the entire periphery of the body 2 of the granule. As shown in FIGS. 1 and 5, the rimmed protrusion 3 may be cut away at a portion 3b (cutaway rimmed protrusion 3).

The size of the protrusion 3 is not particularly limited. However, the thickness of the protrusion 3 is preferably from 0.3 to 0.5 times the diameter of the granule 2, is more preferably 1.5 mm or smaller. When the thickness of the protrusion 3 is too small, the protrusion 3 itself is easy to break, and additionally, the body 2 of the granule is easy to crush.

The size of the granule 1 of the present invention is not particularly limited. However, when the size of the granule 1 is too small, it is insignificant to store the nitric acid-based salt, which is a dangerous article, in a granular shape. Therefore, preferably, the size of the granule 1 is prepared such that the granule 1 cannot pass through a sieve having a mesh size of about 2 mm.

The aggregate of the granules 1 preferably comprises granules which cannot pass through a sieve having a mesh size of about 2 mm in an amount of 90% by weight or larger.

The nitric acid-based salt of the present invention is not particularly limited, so long as it is nitrate, nitrite, a mixture thereof or a hydrate thereof. Examples include alkaline metal salts of nitric acid (e.g., potassium nitrate, sodium nitrate, etc.), alkaline earth metal salts of nitric acid (e.g., calcium nitrate, etc.), ammonium salts of nitric acid (e.g., ammonium nitrate, etc.), alkaline metal salts of nitrous acid (e.g., potassium nitrite, sodium nitrite, etc.), alkaline earth metal salts of nitrous acid (e.g., calcium nitrite, etc.), ammonium salts of nitrous acid (e.g., ammonium nitrite, etc.), hydrates thereof (e.g., calcium nitrite tetrahydrate, etc.), and the like. They may be used alone or in combination. Furthermore, a compound having other component(s) mixed with or incorporated in the nitric acid-based salt may be used. In order to obtain a granule which is hard to break, a nitric acid-based salt compound having a sodium concentration of 30 ppm or lower is more preferable.

The production of the granule of the present invention can be accomplished by any known production process. Preferred examples include a production process comprising compression-molding a nitric acid-based salt compound powder into the granule using a briquetting machine having two rolls.

Figure 6:
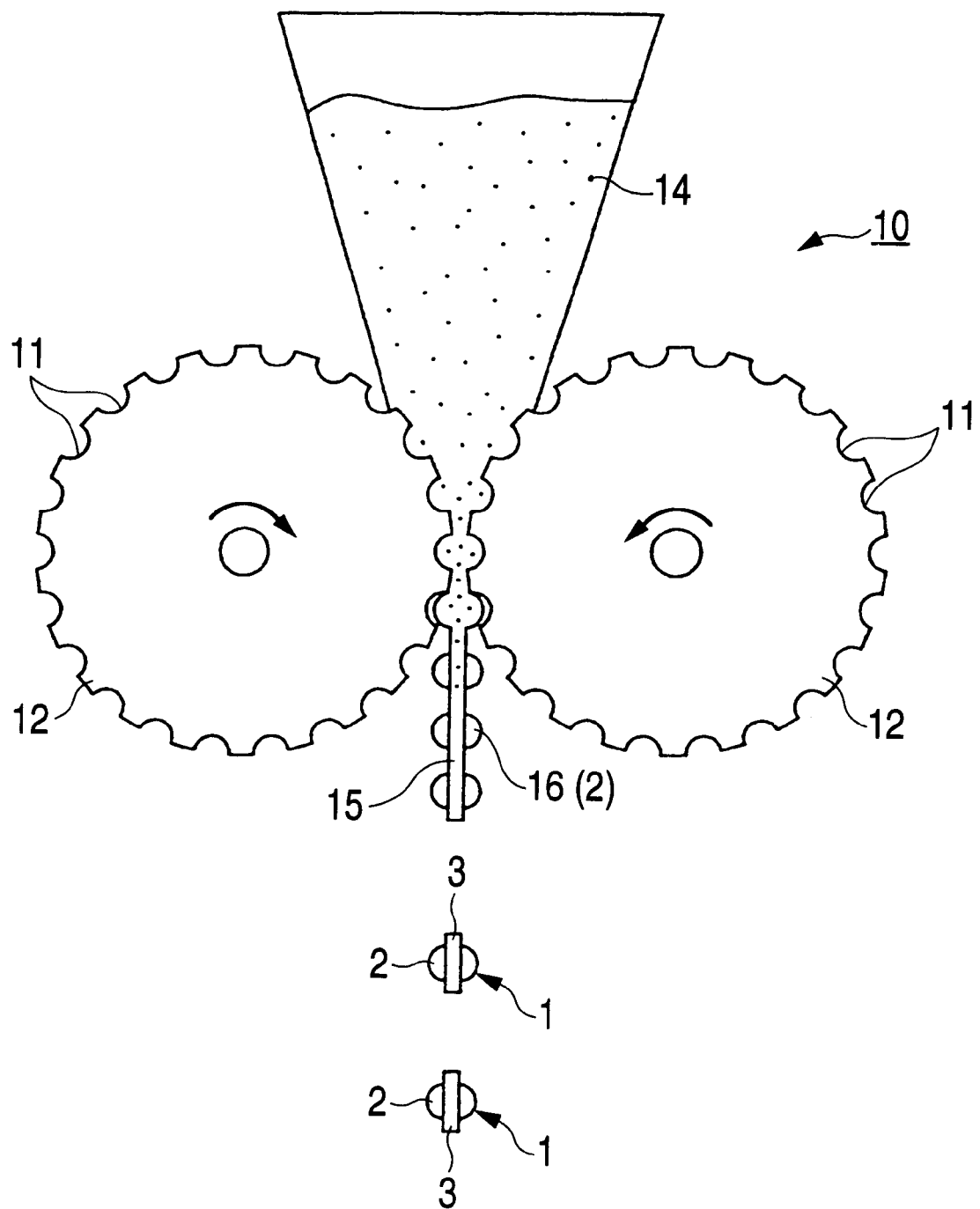
FIG. 6 is a reference view illustrating a briquetting machine.

Specifically, a briquetting machine 10 comprising two juxtaposed rolls 12 each having a large number of indentations 11 having a shape corresponding to that of the desired body 2 of a granule, and a hopper 14 arranged on the upper side between the two rolls 12 as shown in FIG. 6. With the pair of rolls 12 being arranged apart from each other such that the peripheries thereof do not come in contact with each other, the compound powder is supplied from the hopper 14 into the gap while the rolls 12 are being rotated. In this manner, a tabular block 15 having a large number of raised portions 16 formed thereon each having a shape corresponding to that of the indentation 11 on the roll 12 is extruded.

By cutting the tabular block 15 at the portion other than the raised portion 16, a large number of granules 1 each having a protrusion 3 provided on the body 2 of the granule are produced. A large number of the granules 1 obtained by cutting the tabular block 15 at random have protrusions having different shapes. Thus, an aggregate of the granules having amorphous protrusions can be obtained.

Molding is preferably carried out in the absence of a binder component. According to such a process using no binder component, a granule having an excellent solubility in water or other solvents can be obtained. When no binder component is added, a nitric acid-based salt powder having a water content of from 5 ppm to 20,000 ppm (excluding water of crystallization if the salt is a hydrate) is preferably used because it acts as a binder.

Then, the granule thus produced can be classified to obtain a granule or an aggregate thereof having a desired particle size. The classification process is not particularly limited. Any known classification process may be widely used. In practice, however, the granular material is preferably sieved through a lower stage sieve having a mesh size of not smaller than 2 mm and an upper stage sieve having a mesh size of greater than that of the lower sieve.

The aggregate of the granules of the present invention may be a mixture of a granule obtained by connecting two or more bodies to each other via a production(s) with a granule having a protrusion formed on only one body, or may be an aggregate of only the former or latter granule.

The nitric acid-based salt granule of the present invention and the aggregate thereof are hard to roll over, and are hard to landslide when piled up. Accordingly, the aggregate is hard to break into constituent granules and is hard to roll over during transportation on a conveyor, and the like. Therefore, the amount of the starting material which falls wastefully can be reduced.

Furthermore, the granule of the present invention is hard to break if a load is applied, and thus the predetermined shape can be maintained even after prolonged storage.

The present invention will be further described hereinafter based on the following examples.

EXAMPLE 1

A briquetting machine equipped with two rolls (150φ×250 mm) each having a large number of hemispherical indentations having a diameter of 5 mm formed on the surface thereof at an interval of 5.5 mm (distance between the center of the indentations) was used. The hopper of the briquetting machine was loaded with a commercial industrial purified potassium nitrate product (average particle diameter: 0.5 mm; water content: 0.01 to 0.02% by weight; Na concentration: 20 ppm). The gap between the rolls of the briquetting machine was set to 0.5 mm, and the pair of rolls was rotated in opposite directions to compression-mold the powdered potassium nitrate.

The tabular block extruded from the gap between the rolls was then classified by a horizontal vibrating strainer of an upper stage sieve having a mesh size of 8 mm and a lower stage sieve having a mesh size of 2.0 mm to obtain an aggregate of granules which had been left on the sieve having a mesh size of 2.0 mm. The aggregate thus obtained was an aggregate of a large number of granules each comprising the body of the granule rimmed with a protrusion(s) having a thickness of 0.5 mm toward the diameter direction on the periphery of the substantially ellipsoidal body of the granule. The aggregate partially contained granules having two or more bodies of the granules connected to each other via the protrusion. The protrusions in various granules have substantially different shapes.

The weight of potassium nitrate used and the weight and yield of the aggregate thus obtained are shown in Table 1.

EXAMPLES 2–7

Aggregates of potassium nitrate granules of Examples 2 to 7 were obtained in the same manner as in Example 1, except that the gap between the rolls was changed to 1.0 mm, 1.5 mm, 1.8 mm, 2.0 mm, 2.5 mm and 3.0 mm, respectively. The shape of the granules obtained in Examples 2 to 7 were substantially the same as that of Example 1, except that the thickness of the protrusion thereof was the same as the gap between the rolls.

The aggregates of the granules obtained in Examples 1 to 7 were each then measured for a repose angle using a powder tester (produced by HOSOKAWA MICRON CORPORATION). The results are set forth in Table 1 below. For comparison, the repose angle of a commercial potassium nitrate granule in the shape of a true sphere was measured in the same manner as described above.

Subsequently, 10 samples were collected from each of the granules of the various examples which had been measured for the repose angle, the crushing stress was measured using a Kiya type digital hardness tester, and the average value was obtained. The results are shown in Table 1 below.

TABLE 1

| No. | Protrusion thickness (mm) | Starting material amount (kg/h) | Yield of product (kg/h) | Yield (%) | Maximum crushing stress | Repose angle |
|---|---|---|---|---|---|---|
| Ex. 1 | 0.5 | 870 | 750 | 86 | 2.2 | 41 |
| Ex. 2 | 1.0 | 980 | 820 | 84 | 2.6 | 42 |
| Ex. 3 | 1.5 | 1,120 | 930 | 83 | 3.5 | 44 |
| Ex. 4 | 1.8 | 1,500 | 1,250 | 83 | 4.1 | 45 |
| Ex. 5 | 2.0 | 1,740 | 1,350 | 78 | 5.9 | 47 |
| Ex. 6 | 2.5 | 2,000 | 1,460 | 73 | 6.5 | 48 |
| Ex. 7 | 3.0 | 2,102 | 1,350 | 64 | 6.6 | 48 |
| Comp. Ex. | — | — | — | — | 1.8 | 8 |

As shown in Table 1, the granules in Examples 1 to 7 are hard to roll over. It is also shown that, when the protrusion has a thickness (gap between the rolls) of 1.5 mm or larger, the granules has a high load resistance and thus is hard to break, although its mechanism being unknown. In production using a briquetting machine, when the thickness of the protrusion (gap between the rolls) is up to 2.5 mm, preferably up to about 2.0 mm, the yield of the product is good.

Accordingly, a granule having a protrusion having a thickness of from 1.5 mm to 2.5 mm, particularly from 1.5 mm to 2.0 mm, is hard to break and also has an excellent productivity.

This application is based on Japanese application No. 2000-380285 filed on Dec. 14, 2000, the entire content of which is incorporated hereinto by reference.

While the invention has been described in detail and with reference to specific embodiments thereof, it will be apparent to one skill in the art that various changes and modifications can be made therein without departing from the spirit and scope thereof. All references cited herein are incorporated in their entirety.

What is claimed is:

1. A granule of a compound comprising a nitrate or nitrite, wherein a part of the body of the granule is rimmed with a flat, non-circular protrusion.

2. The granule according to claim 1, wherein the protrusion is provided toward the diameter direction on the periphery of the body of the granule along the horizontal plane crossing the center of gravity of the granule.

3. The granule according to claim 1, wherein the body of the granule is of a substantially hemispherical shape or substantially spherical shape.

4. The granule according to claim 3, wherein said substantially spherical shape selected from the group consisting of a true sphere, a flat sphere and an ellipsoid; and said substantially hemispherical shape is selected from the group consisting of a hemisphere, a semi-flat sphere, and a semi-ellipsoid.

5. An aggregate comprising a plurality of granules according to claim 1, wherein the protrusions of the granules are irregular.

6. The granule according to claim 1 wherein the body of the granule is of a substantially spherical shape.

7. A granule according to claim 1, wherein a binder component other than water is not included in the composition of the granule.

8. The granule according to claim 1, wherein the protrusion is provided toward the diameter direction on one periphery of the body of the granule.

9. An aggregate comprising a plurality of granules according to claim 1, wherein the protrusions of the granules are regular.

10. A granule of a compound comprising a nitrate or nitrite, wherein the compound is compressed so that:
   the body of the granule is of a substantially hemispherical shape or substantially spherical shape;
   the body of the granule is rimmed with a flat, non-circular protrusion, wherein the protrusion is provided toward the diameter direction on the periphery of the body of the granule along the horizontal plane crossing the center of gravity of the granule; and
   the body and the protrusion are integrally molded.

11. The granule according to claim 10, wherein the thickness of the protrusion is from 0.3 to 0.5 times the diameter of the body of the granule.

12. An aggregate comprising a plurality of granules according to claim 10, wherein the protrusions of the granules are irregular.

13. The granule of claim 10, wherein said substantially spherical shape selected from the group consisting of a true sphere, a flat sphere and an ellipsoid; and said substantially hemispherical shape is selected from the group consisting of a hemisphere, a semi-flat sphere, and a semi-ellipsoid.

14. An aggregate comprising a plurality of granules according to claim 10, wherein the protrusions of the granules are regular.

* * * * *